Figures 1, 2:
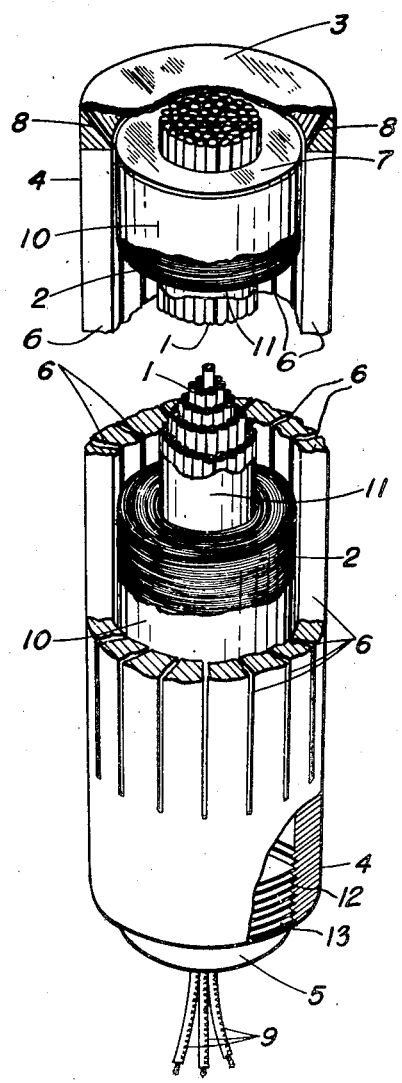

Jan. 18, 1949.　　A. L. ERICKSON ET AL　　2,459,155

PRESSURE CELL

Filed Sept. 19, 1945

Inventors
Albert L. Erickson
James C. Kyle

By Ralph L Chappell

Attorney

Patented Jan. 18, 1949

2,459,155

UNITED STATES PATENT OFFICE 2,459,155

PRESSURE CELL

Albert L. Erickson and James C. Kyle,
Palo Alto, Calif.

Application September 19, 1945, Serial No. 617,418

1 Claim. (Cl. 171—242)

(Granted under the act of March 3, 1883, as amended April 30, 1928; 370 O. G. 757)

This invention relates to a cell for electrically measuring steady or fluctuating pressures. Specifically, the invention is directed to a small fluid pressure responsive cell of a type comprising a magnetic core mounted adjacent to one end thereof and a diaphragm made from magnetic material to form an air gap between the core end and the diaphragm in such manner as to cause changes in the length of the air gap and hence the reluctance of the magnetic circuit in response to deflections of the diaphragm resulting from changes in fluid pressure thereon. A coil is provided around the core to permit measurement of the reluctance, which will be determined by the position of the diaphragm.

An object of this invention is to provide a small cell responsive to steady or rapidly fluctuating air pressures in a manner adapted to provide a remote indication of the pressure.

A further object of the invention is to provide a pressure-indicating system that will be accurately sensitive to very rapid changes in pressure at a location removed from the indicating device.

Further objects and advantages of this invention will be apparent when taken from the description of the drawings in which:

Fig. 1 is a partially cutaway perspective view of the end of the cell according to my invention, which includes the diaphragm, and Fig. 2 is a partially cutaway perspective view of the cell showing the core and coil thereof and including the end opposite to the diaphragm.

The cell shown in the figures comprises a core 1 consisting of a substantially cylindrical bundle or sheaf of insulated magnetic wires or strands, such as iron wires or wires of a magnetic alloy, surrounded by coil 2 of insulated conducting nonmagnetic wires. Insulating material 10 is applied around the coil. A magnetic hollow cylindrical casing 4 is provided surrounding the coil and terminating at its upper end in a beveled portion 8, as shown in Fig. 1. A magnetic diaphragm 3 is suitably secured at its circumference to the beveled upper edge at the top end of the casing. A coil former 7 of insulating material is provided at the coil end nearest the diaphragm to maintain the core and coil in relative position and to prevent the coil turns from slipping. Insulating material 11 is wrapped about the core to insure adequate insulation of the coil. The coil wire ends are fused at the end of the core opposite the diaphragm to a plug 5, the plug being preferably adjustable through a threaded micrometer arrangement including internal threads 12 in the casing 4 and external threads 13 on the plug 5 with respect to the casing 4 to enable close adjustment of the air gap between the diaphragm and the substantially flat surface of the wire ends of the core adjacent to the diaphragm. The core formation of a group of insulated strands provides small magnetic losses, and the magnetic casing 4 may be slotted as at 6 to decrease the losses therein. A center tap is preferably provided for the coil 2 to facilitate its use in bridge circuits. Accordingly, three insulated leads 9 are shown, projecting through plug 5, to which external electrical connections may be made. The cell is adapted for use with an inductance measuring device calibrated in terms of coil inductance or in terms of fluid pressure. Pressures, of course, may be read directly in the case of the latter calibration, although inductance readings may be convenient in certain applications.

In operation, the diaphragm 3 will be caused to flex inwardly to decrease the reluctance of the magnetic circuit (which includes core 1, plug 5, case 4 and diaphragm 3) by reducing the air gap between the diaphragm and the adjacent core end in response to an increased pressure on the diaphragm. As the air gap is reduced in length, the reluctance of the magnetic circuit is decreased, increasing the inductance and inductive impedance of coil 2. A decrease in pressure results in a decreased inductance.

The device is particularly adapted for use in the measurement of pressures developed at desired points in the surface of an aircraft wing or similar structure which may be under operational or wind tunnel tests. In this type of service, it may be desirable to utilize the coil in an impedance bridge which will produce a signal suitable for carrier current or similar transmission to a remote indicating instrument. The bridge unbalance, for instance, may be subjected to amplification and then applied to a recording oscillograph, giving an accurate representation on the oscillograph of the pressure situation at the diaphragm. Utilizing a cell of approximately one-half inch outside diameter and one and one-half inches long, it has been found practicable to measure fluctuations in pressure occurring very slowly or at a rate of more than one thousand times per second with satisfactory accuracy. This range can be extended by the utilization of a cell with a diaphragm of smaller diameter.

In conclusion, it is to be understood that while the embodiment of the invention which has been described is to be preferred, changes may be made in the size, construction and arrangement of parts without departing from the spirit and scope of the appended claim.

The invention described herein may be manufactured and used by or for the Government of the United States of America for governmental purposes without the payment of any royalties thereon or therefor.

What is claimed is:

A pressure sensitive cell comprising a hollow, elongated magnetic casing open at one end, a very thin magnetic diaphragm closing said end and arranged flush therewith so that its outer surface is free and unconfined in space, an elongated magnetic core arranged axially of said casing with one end in proximity to said diaphragm to form an air gap therebetween, and a coil surrounding said core to substantially fill the space between the latter and the casing wall, said coil being spaced inwardly from said diaphragm and designed for external electrical connection.

ALBERT L. ERICKSON.
JAMES C. KYLE.

REFERENCES CITED

The following references are of record in the file of this patent:

UNITED STATES PATENTS

| Number | Name | Date |
|---|---|---|
| 1,548,698 | Young et al. | Aug. 4, 1925 |
| 1,718,494 | Schurig | June 25, 1929 |
| 2,319,219 | Draper et al. | May 18, 1943 |
| 2,320,881 | Newton | June 1, 1943 |